C. CHAMBERS, Jr.
Machines for Folding, Cutting, and Trimming Paper.
No. 141,487.  Patented August 5, 1873.
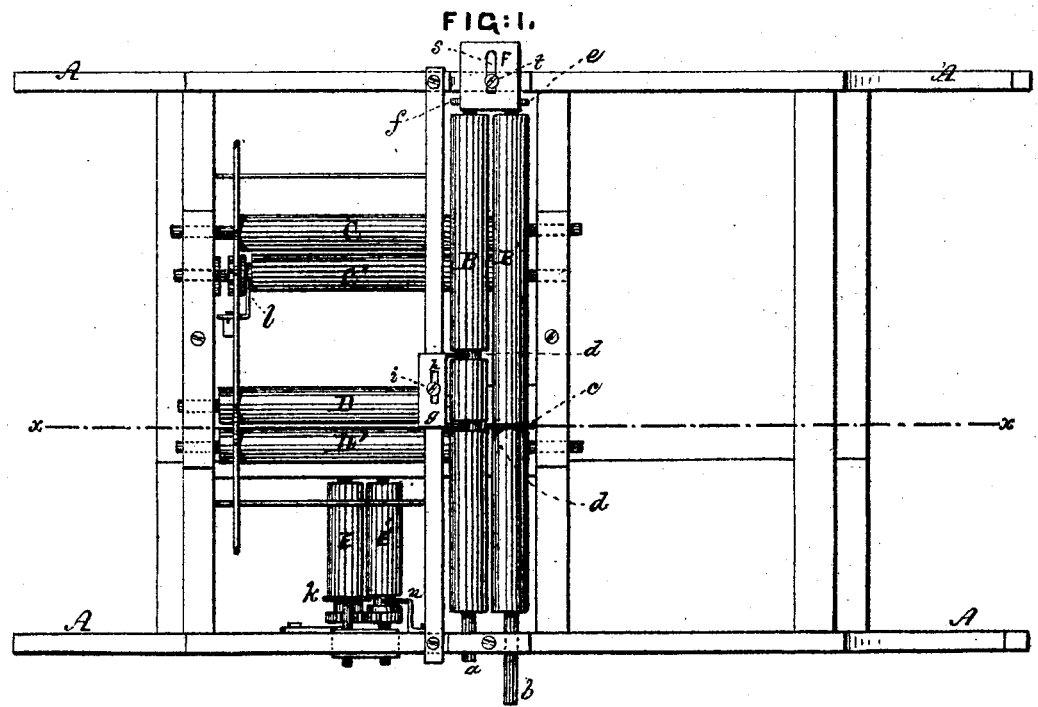

UNITED STATES PATENT OFFICE.

CYRUS CHAMBERS, JR., OF PHILADELPHIA, PENNSYLVANIA.

IMPROVEMENT IN MACHINES FOR FOLDING, CUTTING, AND TRIMMING PAPER.

Specification forming part of Letters Patent No. 141,487, dated August 5, 1873; application filed May 8, 1873.

*To all whom it may concern:*

Be it known that I, CYRUS CHAMBERS, Jr., of the city and county of Philadelphia and State of Pennsylvania, have invented Improvements in Machinery for Folding, Cutting, and Trimming Paper; and I do hereby declare the following to be a full and correct description of the same, reference being had to the accompanying drawings, in which—

Figure 1 is a top or plan view of a folding-machine with my improvements applied. Fig. 2 is a longitudinal vertical section of the upper portion of the machine. Figs. 3, 4, 5, and 6 are detail views.

The same part is marked by the same letter of reference wherever it occurs.

My improvements relate to the modification and adaptation of a circular serrated cutter working in a groove to the purposes of cutting paper while being folded, to the trimming of the folded edges of sheets, and to the slitting of paper in the printing-press. My first improvement consists in driving the cutter by friction by the use of elastic wheels running against the surface of the wheel or roller in which the groove is made, and around or over which the paper passes, so that the sheet to be severed may be firmly held by said friction-rolls, thereby insuring the points piercing the paper and severing it, instead of forcing it into the groove uncut. My second improvement consists in making the teeth or serrations of the cutter angular, so that the greater motion or higher velocity of the points (they being larger in diameter, and therefore moving faster) may sever both ways from the point of perforation, and thus prevent any "draw" or strain on the paper. My third improvement consists in dressing the teeth all from one side, so as to make comparatively a smooth cut on the plane side of the cutter, so that in cutting 12-mo. sheets in a folding-machine the head of the "inset" may be smooth, and the serrated marks be made in the tail of the "outset;" or in trimming the folded edges off of pamphlets the rough serrated part be made on the chips. My fourth improvement consists in adjusting the position of the cutter by moving the roller or wheel in which the groove is made, and allowing the cutter to slide edgewise upon the stud on which it runs, whereby the position of the cut in relation to a 12-mo. sheet, or the amount of chips to be taken off, may be regulated. By moving the roller and cutter by the stop different-sized sheets may be trimmed without changing the amount of chip taken off. My fifth improvement consists in keeping the grooves in which the cutter works clear from the fiber of paper that may be forced into it by a finger or clearer, which is also adjustable with the roller, as shown.

In the accompanying drawings, A marks the frame of the folding-machine, having the same general features as those heretofore invented and patented by me. B B' are the first pair of folding-rollers, turning on journals $a$ $b$, of which rollers B has one or more grooves, $d$ $d$, in it, in which the edges of the cutter run. $g$ is an adjustable plate having a slot, $h$, set-screw $i$, and fingers passing into grooves $d$ $d$ in roller B, as shown in Fig. 1. Both rollers B and B' are simultaneously adjustable longitudinally by means of the stop-plate F, having the slot $s$, set-screw $t$, and plate $f$ passing down into grooves in the ends of rollers B B', as shown in Fig. 1. Attached to roller B' is a cutter, $c$, the edge of which projects into one of the grooves $d$ in roller B. This cutter severs the sheet while receiving the first fold. It must be dispensed with when the sheet is not required to be divided on that line. G marks the cutter, of peculiar construction, which I use in trimming the folded sheet. In Figs. 2 and 3 it is shown in position in the machine, placed below roller B, and its edge running in a groove in said roller. The construction and attachments of the cutter G are clearly shown in Figs. 4, 5, and 6. The cutter is a circular plate of steel having its edge beveled on one side only, as shown in Fig. 6, and teeth $t$ dressed on the beveled side only. The cutter-plate G is held in its stock between two annular disks of rubber, H H', the peripheries of which run in contact with the surface of roller B, as shown in Fig. 3. These rubber disks are clamped between the plate or hub I and washer J, which are held together by nut K, as shown in Fig. 5. The same plate and washer also clamp and hold the cutter G. The hub I of the cutter is hung on a stud projecting from the framing under the roller B. The cutter G slides freely on the stud, so as to adapt itself readily to the longitudinal adjustment of the rollers. A cutter similar in construction and operation is placed below the second pair of folding-rollers C C', running in a groove near the end, for the purpose of trimming off the folded edge of the twice-folded sheet as it is on its way to receive the third fold. It runs in a groove in C', which is kept clear by the finger *l*. Another such cutter, *k*, is also placed under the last pair of folding-rollers E E' in proper position to trim the head of either a sixteen or twenty-four page sheet. *n* marks the finger or clearer for keeping the groove in roller E' clear of paper. When the sheet is severed after being but once folded the friction between the roller and the rubber disks can be relied upon to operate the cutter; but when there are more than two thicknesses of paper the cutter should be driven by gears on the rollers, in order to secure, positively, the power required to trim the sheet.

The operation of the machine is obvious from the description. The beveled form of the cutter-edge and the mode of dressing its teeth result in throwing all the roughness of the cut on that side of the cutter on which the bevel is placed, leaving the edge of the paper in contact with the straight side of the cutter smooth and even.

Having thus fully described my improvements, what I claim, and desire to secure by Letters Patent, is—

1. The combination, with the cutter G, of the rubber-actuating disks H H', arranged and operating in the manner and for the purpose described.

2. The angular or inclined arrangement of the cutter-teeth as distinguished from teeth radially arranged, as and for the purpose set forth.

3. The cutter G, whether having inclined, angular, or radial teeth, dressed on a bevel on one side of the cutter-plate, as described and represented, for the purpose specified.

4. The arrangement of the cutter loosely on a stud projecting from the frame, as described, for the purpose of enabling it to accommodate itself to the longitudinal adjustments of the folding-rollers, as stated.

5. The arrangement, in combination with the grooves in which the circular cutters work, of adjustable clearing-fingers to keep said grooves free from chips or shreds of paper, as set forth.

The above specification of my said invention signed and witnessed at Philadelphia this 2d day of May, A. D. 1873.

CYRUS CHAMBERS, JR.

Witnesses:
CHAS. M. MORELL,
THORWALD CHR. DAMBORG.